United States Patent
Grey

[15] 3,664,519
[45] May 23, 1972

[54] METHOD AND APPARATUS FOR FORMING A TIE PATTERN OF BALES ON A BALE WAGON

[72] Inventor: Donald M. Grey, Selma, Calif.

[73] Assignee: Sperry Rand Corporation, New Holland, Pa.

[22] Filed: Aug. 7, 1970

[21] Appl. No.: 61,966

[52] U.S. Cl............................................214/6 B, 214/518
[51] Int. Cl..........................................................B65g 57/26
[58] Field of Search................214/518, 519, 520, 521, 522, 214/6 B, 6 P

[56] References Cited

UNITED STATES PATENTS

| | | | |
|---|---|---|---|
| 3,501,025 | 3/1970 | Jay et al. | 214/6 B |
| 3,446,369 | 5/1969 | May et al. | 214/6 B |
| 3,528,564 | 9/1970 | Fischer | 214/6 B |
| 3,523,616 | 8/1970 | Neely, Jr. | 214/6 B |
| 3,549,023 | 12/1970 | Blackmun | 214/6 B |
| 3,497,085 | 2/1970 | Jay et al. | 214/6 B |
| 3,395,814 | 8/1968 | Grey | 214/6 B |

Primary Examiner—Robert J. Spar
Attorney—Joseph A. Brown, John C. Thompson, James J. Kennedy and George C. Bower

[57] ABSTRACT

A method and apparatus for forming a tie pattern of bales on a stacking table of a bale wagon. The method includes the steps of receiving a first array of longitudinally aligned bales on the stacking table, fixing the outermost or flanking bales of the first array for pivotable movement about a point, removing the bale or bales extending between the flanking bales of the first array, and inserting a series of a second array of longitudinally aligned bales generally midway between the fixed flanking bales. The apparatus for forming the tie pattern comprises tines extending through a stacking table for fixing the flanking bales for pivotal movement about a point, paddles for removing the bale or bales extending between the flanking bales of the first array and a receiving table disposed adjacent the stacking table for transferring bales thereto in either the first array or second array.

20 Claims, 20 Drawing Figures

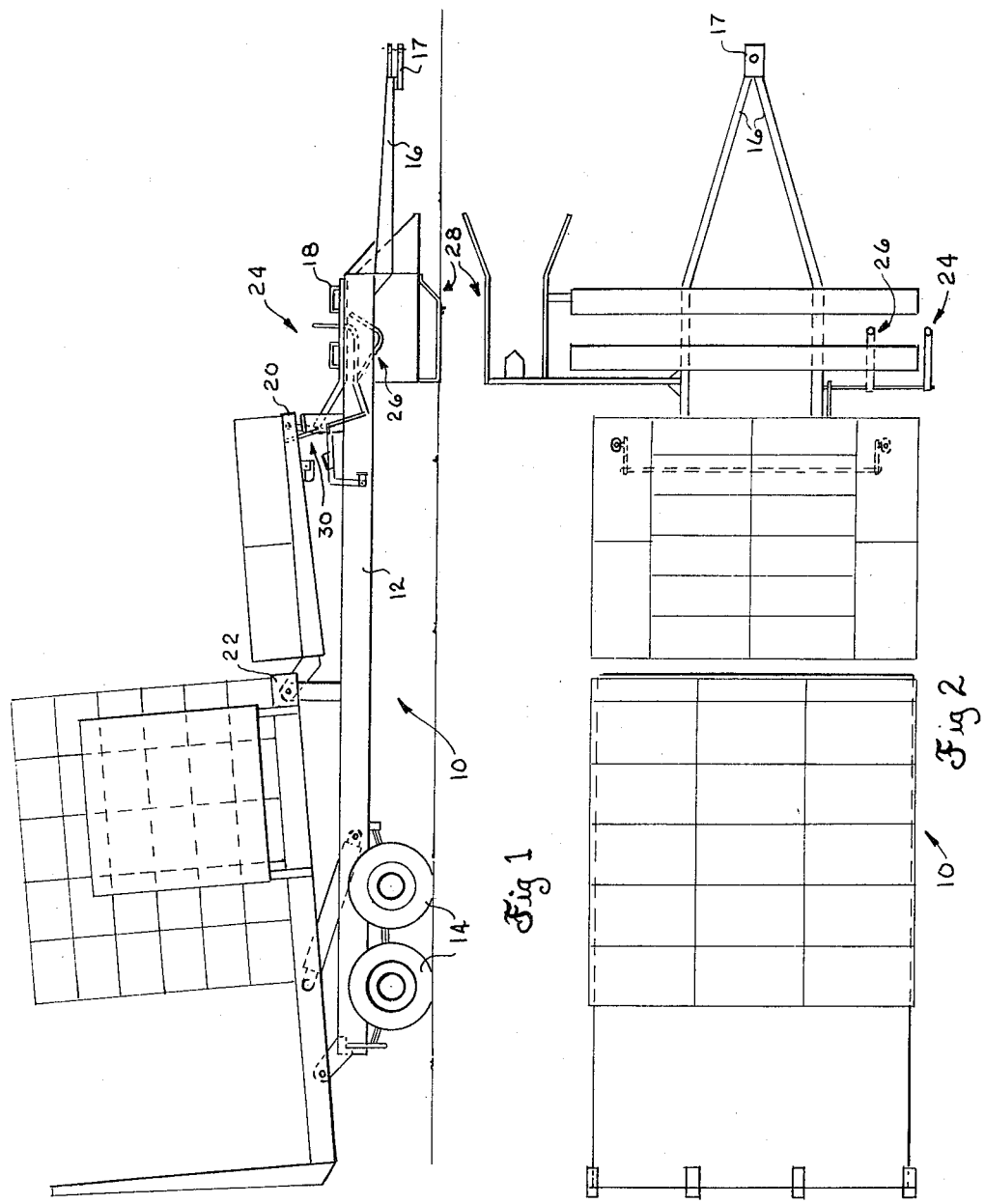

INVENTOR.
DONALD M. GREY
BY
*John C. Thompson*
ATTORNEY

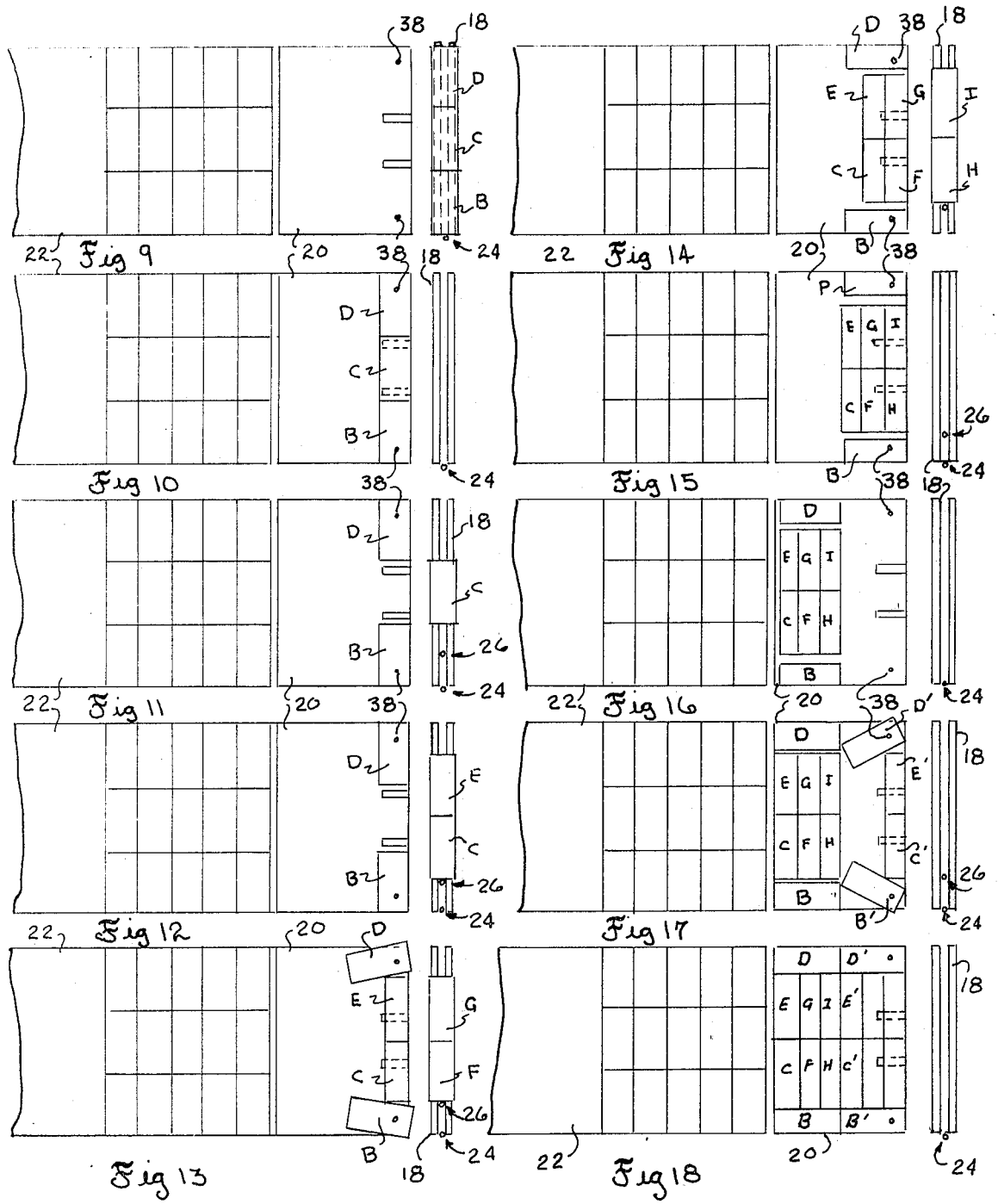

METHOD AND APPARATUS FOR FORMING A TIE PATTERN OF BALES ON A BALE WAGON

BACKGROUND OF INVENTION

This invention relates to bale wagons and more particular to a method and apparatus for forming a tie pattern of bales thereon.

Grey, U.S. Pat. No. 2,848,127, introduced the cooperating three table concept to the bale wagon art. The three tables, often referred to as a receiving table, a stacking table and a load table, are tandemly arranged longitudinal to the wagon chassis and pivotally mounted about an axis extending transversely the direction of travel. In operation bales are picked up from the field, conveyed transversely across the receiving table to form a row of longitudinally aligned bales. The receiving table transfers successive rows of bales to the stacking table to form a tier or layer of bales thereon. The stacking table in turn successively stacks the tiers or layers vertically onto the load table to form a stack thereon. Normally the tiers formed by the stacking table are comprised of a series of longitudinally aligned rows positioned in side by side relationship transverse to the bale wagon. Since in the formation of a stack the tiers are stacked adjacent to each other in alignment, individual bales of each tier form a section of a longitudinal column. These longitudinal columns become vertically orientated when the load is vertically stacked in a stacking area. To assure that the vertical columns do not separate and spill outwardly from the stack, a tie tier is formed in the upper half of the stack. The essence of the tie tier is that the bales contained therein are disposed in a pattern distinct from the normal tier pattern such that when the tie tier is stacked adjacent a normal tier the bales therein extend across the longitudinal columns, tending to hold them together.

Initially the tie tier for the two wide bale wagon was formed by receiving a number of bales onto the stacking table and rearranging these by hand to form a tie pattern. Grey U.S. Pat. No. 3,395,814 then introduced a mechanism for automatically forming a tie pattern for a two wide bale wagon. This device consisted of a pair of tines for fixing the outer ends of the first two bales received on the stacking table for pivotable movement about a point and means for inserting a series of single bales between the fixed bales, causing them to pivot and extend longitudinally about the sides of the stacking table.

The development of the three wide bale wagon presented a more perplexed situation in that an inner bale was situated between two flanking bales. Grey's method for forming a two wide tie was inapplicable to the three wide stack since there was no teaching as to a manner of operating on an inner bale. Moreover Grey's mechanism did not engage the inner bale and position it within a tie pattern.

It is therefore the primary object of the present invention to provide a method and an apparatus for forming a tie pattern for a three or more wide bale wagon.

More specifically, it is the object of the present invention to provide a method and an apparatus for forming a tie pattern on the stacking table of a three table bale wagon in which the three tables, a receiving table, a stacking table, and a load table are tandemly arranged longitudinally to the wagon chassis.

A further object of the present invention is to provide a method of forming a three wide tie pattern about the stacking table of a bale wagon by receiving three longitudinally aligned bales from a receiving table, fixing the outermost bales for pivotable movement about a point and removing the inner bale extending between the outermost bales, and inserting a series of two longitudinally aligned bales between the fixed outermost bale causing them to pivot ninety degrees.

A further object of the present invention is to provide a mechanism interlocked with the stacking table that may be selectively actuated to perform the above method, the mechanism includes tines for fixing the outermost bales for pivotable movement about a point, bale removing means for removing the inner bale, and a trip mechanism for actuating the receiving table whereby the series of two longitudinally aligned bales are inserted between the outermost bales.

Other objects and advantages of the present invention will become apparent and obvious from a study of the following description and the accompanying drawings which are merely illustrative of the present invention.

DESCRIPTION OF THE DRAWINGS

FIG. 1 is a side elevational view of a bale wagon with the automatic three wide tie mechanism disposed beneath the forward portion of the stacking table. The tie tier, which forms the sixth tier of the stack is shown completely formed on the stacking table.

FIG. 2 is a plan view of FIG. 1.

FIGS. 9–18 are a sequence of plan views showing the method of forming a tie tier for $14 \times 18 \times 41$ inch bales.

DESCRIPTION OF PREFERRED EMBODIMENT

Figure 3:
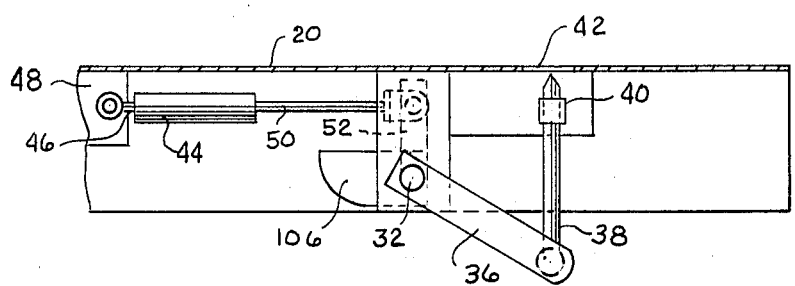
FIG. 3 is an enlarged fragmentary side elevational view of the tines or spikes.

With reference to the drawings in more detail, particularly FIGS. 1 and 2, a bale wagon of the type shown and described in Grey, U.S. Pat. No. 2,848,127, is indicated generally at 10 and includes a chassis 12 mounted by wheels 14. Extending forwardly from the chassis 12 is a tongue 16 having a hitch or clevis 17 for coupling the wagon 10 with a pulling means. Tandemly arranged on the chassis 12 is a first receiving table 18, a second stacking table 20, and a third table or load bed 22.

Each of the tables 18, 20, 22 is pivotable upwardly about an axis extending transversely across the rear thereof by hydraulic lift means, not shown. For actuating the hydraulic lift means of the receiving table 18 a pair of trip mechanisms 24, 26 are disposed about one side thereof (FIG. 2). Both mechanisms 24, 26 are operatively linked with the control valve of the lift means of the receiving table 18 such that the outward movement of either of the trip mechanisms results in the upward pivotable movement of the receiving table. As seen in FIG. 1 the outermost trip mechanism 24 is normally operative as the inner trip mechanism 26 is only operative during the formation of a tie tier. The inner trip mechanism 26, often referred to as a two bale trip mechanism, will be subsequently described in greater detail as it forms an integral part of the tie mechanism.

Continuing with the detail description of the bale wagon 10, a pickup mechanism 28 is supported from the chassis 12 adjacent the side of the receiving table 18 opposite the trip mechanisms 24, 26. The pickup mechanism 28 functions to pick up bales from the field and convey them onto the receiving table 18. Reference may be made to the above mentioned Grey U.S. Pat. No. 2,848,127 for the details of the pickup mechanism 28 as well as other details for understanding the unified operation of the Grey machine.

The automatic tie mechanism for forming a tie tier is disposed generally beneath the forward portion of the stacking table 20. The tie mechanism is comprised of two major mechanisms. A first mechanism 30 interlocked with the stacking table 20 for shifting and removing bales disposed thereon and a second mechanism 26, previously referred to as a two bale trip mechanism, for actuating the lifting means of the receiving table such that two bales are delivered therefrom to a specified area on the stacking table 20.

Figure 4:
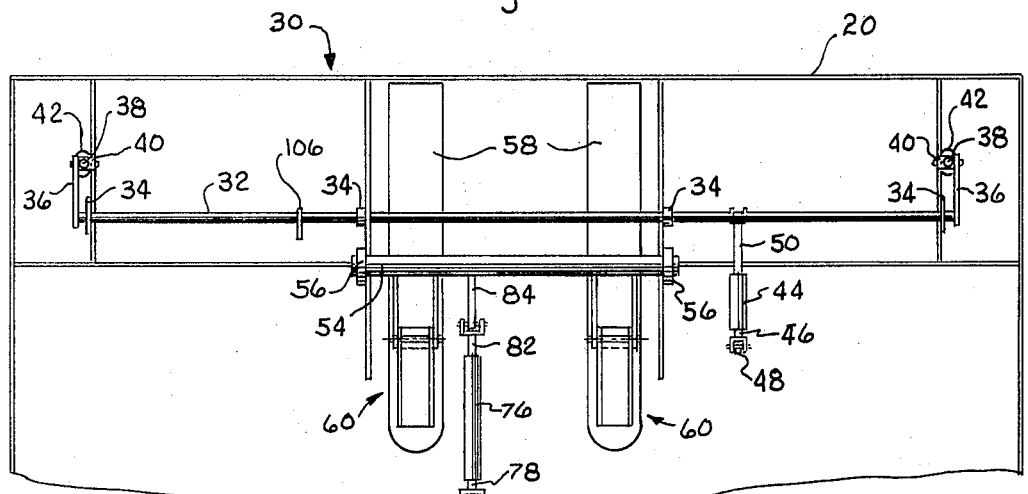
FIG. 4 is a bottom plan view of the tie mechanism.

Turning to FIG. 4, the first mechanism 30 is shown from beneath the stacking table 20 and is comprised of means for fixing bales for pivotal movement about a point and means for removing a single bale from the stacking table. The means for fixing the bales for pivotable movement is comprised of a first rockshaft 32 rotably mounted by brackets 34 transversely beneath the front end of the stacking table 20. Affixed to the opposite ends of the rockshaft 32 are a pair of arm 36 which depend downwardly and generally forwardly therefrom. Pivotally mounted to the lower ends of arm 36 are a pair of spikes or tines 38 which project upwardly therefrom through rotatable guides 40 which are mounted transversely across openings 42 within the forward corners of the stacking table 20. For rotating the rockshaft 32 and consequently moving the tines 38 upwardly and downwardly through openings 42, a remotely controlled double acting hydraulic cylinder 44 is operatively connected to the rockshaft 32. As seen in FIG. 3 the anchor end 46 of the cylinder 44 is pivotally secured to a mounting bracket 48 depending from the underside of the stacking table 20 while the rod end 50 connects to a drive arm 52 extending upwardly from the rockshaft 32.

Figure 5:
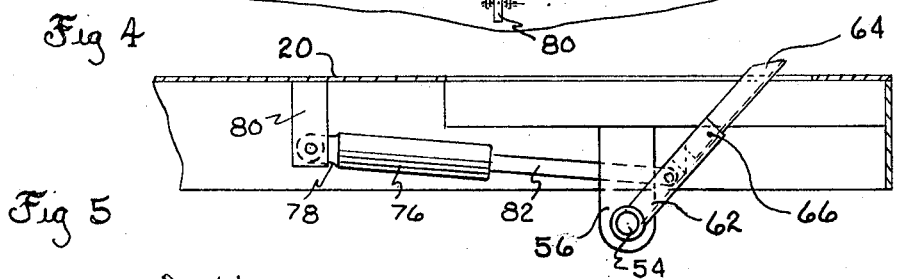
FIG. 5 is an enlarged fragmentary side elevational view of the paddles or bale removing means.

Continuing to refer to FIG. 3, the bale removing means comprises a second rockshaft 54 which is rotatably mounted within brackets 56 depending from beneath the stacking table 20. (FIG. 5) The rockshaft 54 is spaced below the floor of the stacking table and extends transversely beneath a pair of longitudinal opening 58 within the stacking table. Fixed to opposite end sections of the rockshaft 54 are a pair of paddles 60 which extend upwardly therefrom in longitudinal alignment with the openings 58.

Figure 6:
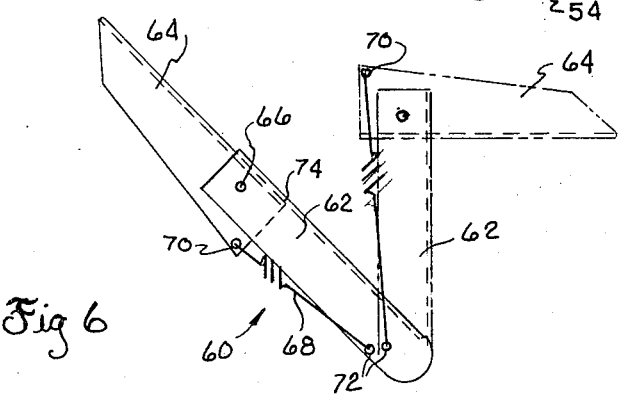
FIG. 6 is a fragmentary detail view of the paddles.

Now with reference to FIG. 6 it is seen that the paddles 60 include a lower section 62 and an upper section 64 pivotally secured together by a pivot pin 66. A tension spring 68 extends between a point 70 located about the lower rear portion of the upper section 64 and a point 72 on the lower section 62, thereby biasing the upper section 64 for rearward pivotal movement about the axis of the pivot pin 66. But the degree of rearward pivotable movement of the upper section 64 is limited by the abutment of its lower forward portion with the forward wall of the lower section 62, shown by numeral 74. This limitation maintains the upper section 64 in a generally upright position longitudinally aligned with the lower section 62. Although not specifically shown the upper portion of the forward wall of the lower section 62 is indented to enable the upper section to pivot forwardly as shown in dotted lines of FIG. 6.

Referring back to FIGS. 4 and 5 the rockshaft 54 and consequently the paddles 60 are actuated back and forth by a second double acting hydraulic cylinder 76. The anchor end 78 of the cylinder 76 is pivotally secured within a bracket 80 depending from the underside of the stacking table while the rod end 82 is connected to a drive arm 84 extending from the rockshaft 54.

Figure 7:
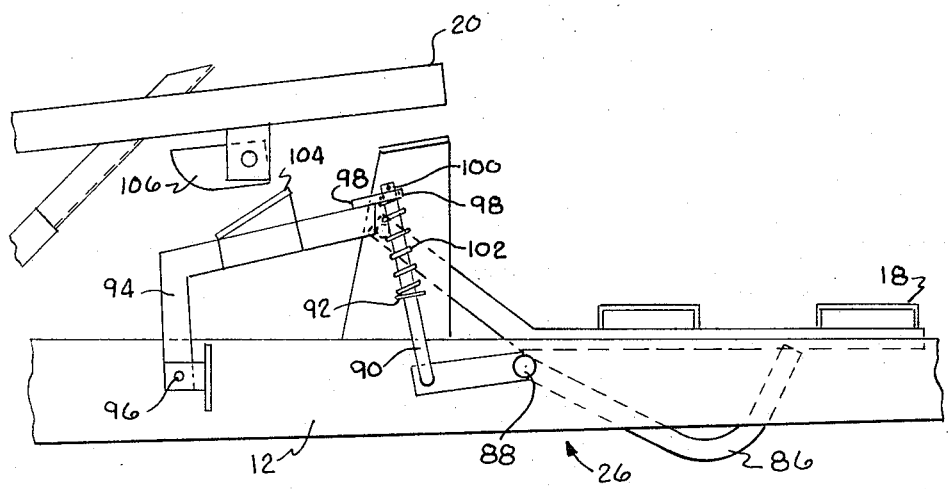
FIG. 7 is a fragmentary side elevational view of the two bale trip mechanism in the nonoperative position.
Figure 8:
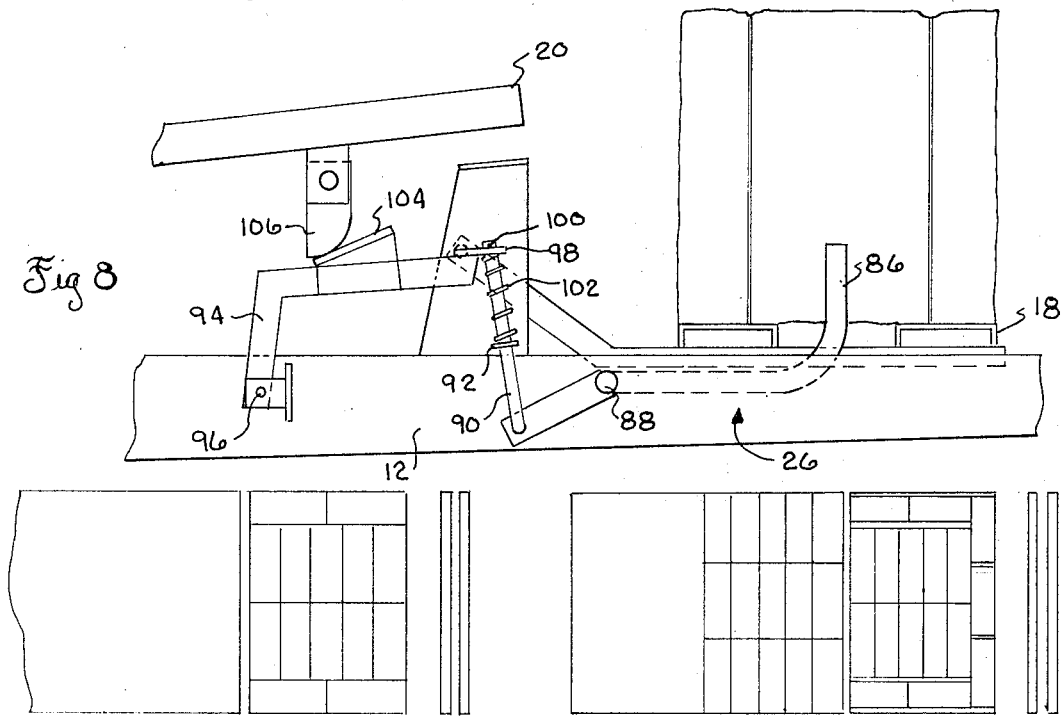
FIG. 8 is a fragmentary side elevational view of the two bale trip mechanism in the operative position.

Turning to FIGS. 7 and 8 the two bale trip mechanism 26 is shown in its nonoperative and operative modes respectively. This mechanism is comprised of a sensing arm 86 which is pivotable about a transversely extending shaft 88 from the nonoperative position (FIG. 7) to the operative position (FIG. 8). Additionally the portion of the sensing arm 86 extending forwardly of the shaft 88 is pivotable outwardly about the generally upright axis of a swivel means, not shown. Also not shown is a lateral linkage arrangement joining the forward portion of sensing arm 86 with the control valve of the receiving table 18. The linkage is so structured that the outward pivotable movement of the sensing arm 86 about the swivel actuates the control valve of the receiving table causing it to cycle and deliver bales thereon to the stacking table 20. Extending upwardly from the rear end of the sensing arm 86 is a connecting rod 90 having a stop 92 fixed intermediately therearound. Disposed rearwardly of the sensing arm 86 is a generally L-shaped actuating arm 94 which is pivotally secured to the chassis 12 about a transverse axis 96. Extending forwardly from the front end of actuating arm 94 is a plate 98 with a circular opening therein for receiving the connecting rod 90 therethrough. The plate 88 is confined about the connecting rod 90 from the top by a pin 100 and from beneath by a coil spring 102. The spring 102 is compressively held between the stop 92 and the underside of the plate 98 thereby biasing the actuating arm 94 upwardly to its normally nonoperative position. Mounted to the back of the L-shaped actuating arm 94 and inclined forwardly therefrom is a cam plate 104. Rotatably mounted to the rockshaft 32 is a cam 106, the cam being disposed directly over the cam plate 104 for engagement therewith. The cam 106 is positioned so as to engage the cam plate 104 and consequently move the two bale trip mechanisms 26 into the operative mode when the rockshaft 32 is rotated for actuating the tines 38.

METHOD AND OPERATION

In the operation of the bale wagon 10, bales are loaded from the field onto the receiving table 18, one bale at a time by the pickup mechanism 28. The bales are normally moved across the receiving table 18 by a cross conveyor, not shown, until three bales are fully loaded thereon. The trip mechanism 24 is so positioned that once the three bales have been fully loaded the first of the three bales engages the mechanism 24 pivoting it outwardly, thereby actuating the control valve of the receiving table causing it to cycle and deliver the three bales thereon to the stacking table 20. The receiving table continues to deposit rows of three bales onto the stacking table until, in the case of 14 × 18 × 41 inch bales, six rows are disposed thereon, the rows extending transversely the stacking table in side by side relationship. These six longitudinally aligned rows form a basic tier which is vertically stacked on the load table by the hydraulic lift means of the stacking table, not shown. The particular bale wagon shown in FIGS. 1 and 2 has an eight tier capacity and after stacking five tiers thereon it is desirable then to form the tie tier which becomes the sixth tier of the stack.

The method of forming the pattern for the tie tier with 14 × 18 × 41 inch bales is shown in FIGS. 9–16. First three bales B, C, D are received in longitudinal alignment along the receiving table 18 (FIG. 9). Bale B engages the trip mechanism 24 which actuates the control valve of the hydraulic lift means of the receiving table causing it to cycle and deposit the three bales B, C, D along the forward end of the stacking table 20 (FIG. 10). At this point the hydraulic cylinders 44 and 76 of the tie mechanism are actuated. Cylinder 44 rotates the rockshaft 32 which drives the tines 38 upwardly through openings 42 into piercing engagement with the flanking bales B and D. As the rockshaft 32 is rotated, the cam 106 rotates downwardly engaging the cam plate 104 which moves the two bale trip mechanism 26 from the nonoperative mode to the operative mode. (FIGS. 7 and 8). Simultaneously the cylinder 76 rotates the rockshaft 54 such that the paddles 60 sweep forwardly, up through opening 52 pushing the middlemost bale C from the stacking table 20 back onto the receiving table 18 (FIG. 11). Another bale E is loaded onto the receiving table (FIG. 12) and conveyed thereacross forcing bale D against the now operative two bale trip mechanism 26 causing the receiving table to cycle and deposit the two bales generally midway between the flanking bales B and D (FIG. 13). Since the two flanking bales B and D are fixed about a point by the tines 38 they pivot approximately 90° as bales C and E are inserted longitudinally therebetween. After bales C and E have been deposited on the stacking table two more bales F and G are received on the receiving table (FIG. 13) and are likewise inserted between the flanking bales B and D (FIG. 14). The basic pattern for the tie tier is completed when bales H and I are received on the receiving table (FIG. 14) and deposited on the stacking table (FIG. 15). The operator then disengages the tie mechanism causing the tines 38 to be retracted from the flanking bales B and D and the paddles 60 to be moved rearwardly to their initial position. As the paddles 60 are moved rearwardly the upper section 64 engages the section of bales disposed between the flanking rail bales B and D. In order that this section of bales are not disturbed the upper section 64 pivots forwardly as the paddles 60 move rearwardly (shown in dotted lines of FIG. 6). Additionally, as the tines 38 are retracted the rockshaft 32 rotates such that cam 106 moves upwardly disengaging the cam plate 104. The spring 102 then biases the actuating arm 94 upwardly allowing the sensing arm 86 of the two bale trip mechanism to fall downwardly into the nonoperative mode (FIG. 8). Next the stacking table 20 is pivoted upwardly approximately 45° causing the basic pattern of FIG. 15 to slide undisturbed to the rear thereof, (FIG. 16), making room for a like pattern about the forward half of the table. Three new bales B', C', D', are received on the receiving table and the method and operation previously discussed and shown in FIGS. 9–15 is repeated to form a second basic tie pattern, identical with the first pattern shown in FIG. 15, which is disposed forwardly of the first pattern to form the tie tier shown in FIG. 18. An intermediate step in forming the front pattern of the tie tier is shown in FIG. 17 in which bales C' and E' are inserted between bales B' and D'.

Figure 19:
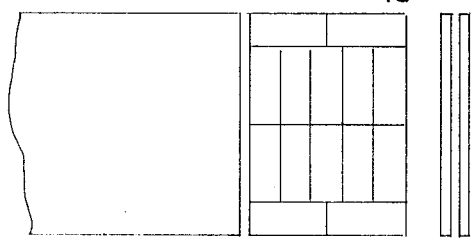
FIG. 19 is a plan view of the second table showing a tie tier formed by $16 \times 18 \times 41$ inch bales.
Figure 20:
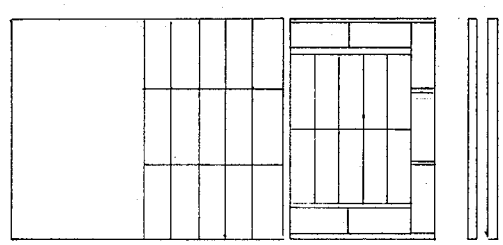
FIG. 20 is a plan view of the second table showing a tie tier formed by $14 \times 18 \times 36$ inch bales.

FIG. 19 shows a tie tier for 16 × 18 × 41 inch bales. It is formed by substantially the same method or set forth above in the case of 14 × 18 × 41 inch bales with the exception that the section of bales extending between the rail or flanking bales contains one less row. This is accomplished by disengaging the tie mechanism and pivoting the stacking table upwardly after only two rows of bales have been positioned between the rail bales B, D. In the case of 14 × 18 × 36 inch bales an additional row of three bales is deposited forwardly along the front edge of the stacking table (FIG. 20).

After the tie tier has been formed the stacking table pivots upwardly and vertically stacks the tie tier adjacent the fifth tier. Two additional tiers like the first five tiers are then formed on the stacking table and stacked on the load table to complete the formation of the stack.

The terms, "upper," "lower," "forward," "rearward," etc. have been used herein merely for the convenience of the foregoing specification and in the appended claims to describe the tie mechanism and its parts as oriented in the drawings. It is to be understood, however, that these terms are in no way limiting to the invention since the tie mechanism may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described the invention what is claimed is:

1. A tie mechanism for a bale wagon comprising in combination: a chassis; a load table mounted on said chassis; a stacking table mounted on said chassis adjacent to said load table; and a tie mechanism disposed adjacent said stacking table for selectively forming a tie pattern of bales thereon, said tie mechanism moveably mounted for engagement and disengagement with bales associated with said stacking table and including bale pivoting means for selectively pivoting individual bales during the formation of a tie pattern, and means for removing an individual bale from said stacking table independently of other bales thereon during the formation of the tie pattern.

2. A tie mechanism for a bale wagon as recited in claim 1 wherein a receiving table is mounted adjacent said stacking table for transferring bales thereto and a trip mechanism operatively responsive to the engagement of said tie mechanism is mounted about said receiving table for activating the same during the formation of the tie pattern.

3. A tie mechanism for a bale wagon comprising in combination: a chassis; a load table mounted rearwardly on said chassis; a stacking table mounted on said chassis forwardly of said load table for stacking bales thereon, and a tie mechanism for forming a tie pattern of bales on said stacking table moveably mounted beneath openings within said stacking table for movement therethrough and for engagement with bales thereon; said tie mechanism including tine means for fixing bales about a point for pivotal movement thereabouts and bale removing means for removing an individual bale from said stacking table independently of other bales thereon.

4. A tie mechanism for a bale wagon as recited in claim 3 wherein said tine means are operatively connected to rockshaft means extending beneath said stacking table and wherein said bale removing means includes paddles secured to said rockshaft means and extending radially therefrom, said rockshaft means being adapted for back-and-forth rotational movement whereby the rotation thereof causes said tine means and said paddles to engage bales situate over said openings within said stacking table.

5. A tie mechanism for a bale wagon as recited in claim 4 wherein said rockshaft means extends transversely beneath said stacking table, said tine means includes a pair of spikes, each operatively connected at opposite end portions of said rockshaft means, and said paddles are secured about said rockshaft means intermediately between said spikes.

6. A tie mechanism for a bale wagon as recited in claim 5 wherein the combination further includes a receiving table mounted forwardly of said stacking table for transferring a first number of bales to a first area on said stacking table and a trip mechanism operatively responsive to the engagement of said tie mechanism and engageable with said receiving table for activating said receiving table for transferring a second number of bales onto a second area of said stacking table.

7. A tie mechanism for a bale wagon as recited in claim 6 wherein said rockshaft means include a cam disposed therearound for engagement with said trip mechanism whereby the activation of the tie mechanism causes said trip mechanism to become operative.

8. In a bale wagon having a chassis, a load table mounted rearwardly on said chassis, and a stacking table mounted forwardly of said load table, the improvement comprising a tie mechanism disposed forwardly and beneath said stacking table for forming a tie pattern of bales thereon, said tie mechanism includes rockshaft means extending transversely beneath the forward portion of said stacking table and rotatable back-and-forth between a first and second position, arms extending radially from opposite end portions of said rockshaft means, spikes attached to the outer ends of said arms for movement through openings about the forward corner portions of said stacking table as said rockshaft means is rotated from said first position to said second position, and bale removing means fixed to said rockshaft means intermediately between said spike and extending radially therefrom for movement through openings within said stacking table as said rockshaft means is rotated between said first and second position.

9. A bale wagon as recited in claim 8 wherein said rockshaft means is driven by remotely controlled hydraulic cylinder means.

10. A bale wagon as recited in claim 8 wherein a receiving table is mounted forwardly of said stacking table for transferring bales thereto and a trip mechanism operatively responsive to the engagement of said tine mechanism is engageable with said receiving table for activating the same during the formation of the tie pattern.

11. A bale wagon as recited in claim 10 wherein said bale removing means includes a plurality of elongated paddles radially extending from said rockshaft means, said paddles having upper portions pivotal forwardly about an axis extending transversely thereof, and said upper portions being spring biased rearwardly whereby during disengagement of said tie mechanism said upper portions pivot forwardly as said paddles move rearwardly and engage bales on said stacking table, thereby avoiding disruption of said bales.

12. A bale wagon as recited in claim 11 wherein said trip mechanism includes a sensing arm moveably mounted adjacent said receiving table for movement between an operative and nonoperative position, said sensing arm being communicatively connected to an actuating arm by a connecting rod, said actuating arm disposed adjacent a cam means secured about said rockshaft means for engagement therewith and biased upwardly for maintaining said sensing arm in said nonoperative position, said cam means arranged on said rockshaft means such that the actuation of said tie mechanism causes said cam means to engage said actuating arm thereby moving said sensing arm from said nonoperative position to said operative position.

13. An apparatus for forming a tie pattern of bales on a bale wagon, comprising:
a forming table mounted on said bale wagon;
means moveably mounted adjacent said forming table for transferring an array of three bales in longitudinal alignment to said forming table;
means disposed adjacent said forming table for fixing the outermost bales of said array for pivotal movement about a point and removing the inner bale extending therebetween from said stacking table; and
means moveably mounted adjacent said forming table for successively inserting a series of bale rows transversely between said outermost bales of said array, said bale rows including two bales in longitudinal alignment, whereby the first of said rows engages the inwardly extending portions of said outermost bales causing said outermost bales to pivot approximately 90° thereby forming a tie pattern which includes a series of rows extending transversely between and normal to the sides of said pivoted outermost bales.

14. An apparatus for forming a tie pattern on a bale wagon as set forth in claim 13 wherein said forming table includes means for pivotable movement, whereby said forming table may be pivoted upwardly inducing said tie pattern to slide from a first area to a second area.

15. A method of forming a tie pattern for a bale stack comprising the steps of: receiving an array of bales onto a forming table, said array of bales including an inner bale section with flanking bales to each side thereof; fixing said flanking bales for pivotable movement about a point and removing said inner bale section extending between said flanking bales; and inserting a series of second bale sections between said flanking bales, said second bale sections being longer than the removed inner bale section thereby causing the flanking bales to pivot about the fixed point.

16. A method of forming a tie pattern on a stacking table of a bale wagon, comprising the steps of: receiving a first array of longitudinally aligned bales onto said stacking table, said first array of bales including an inner bale section with flanking bales to each side thereof; fixing the flanking bales of said first array for pivotable movement about a point; removing the inner bale section extending between the flanking bales from the stacking table; and inserting a series of a second array of longitudinally aligned bales midway between the flanking bales, said second array of bales including one less bale than said first array.

17. A method of forming a tie tier on a forming table of a bale wagon comprising the steps of:
first, receiving an array of three bales in longitudinal alignment onto a first area of said forming table;
secondly, fixing the outermost bales of said array for pivotable movement about a point and removing the inner bale extending therebetween from said forming table;
thirdly, inserting successively a series of three bale rows transversely between the outermost bales, each row including two bales longitudinally aligned, whereby the first of said rows engages the inwardly extending portions of the outermost bales as said rows are inserted therebetween causing said outermost bales to pivot approximately 90°, thereby forming a first section of bales on said first area of said forming table which includes the three bale rows extending transversely between and normal to the sides of said pivoted outermost bales;
fourthly, transferring said first section of bales from said first area to a second area on said forming table; and
finally, repeating the first three steps to form a second section of bales like said first section on said first area of said forming table thereby forming a tie tier which includes the two like section of bales disposed adjacent each other on said forming table.

18. The method of forming a tie tier on the forming table of a bale wagon as set forth in claim 17 wherein said step of transferring said first bale section from said first area to said second area of said forming table includes pivoting said first area of said forming table upwardly thereby inducing said first bale section to slide to said second area of said forming table.

19. A method of forming a tie tier on a forming table of a bale wagon comprising the steps of:
receiving a first array of three bales in longitudinal alignment onto a first area of a forming table;
fixing the outermost bales of said first array for pivotal movement about a point and removing the inner bale extending therebetween from said forming table;
inserting successively two bale rows transversely between the outermost bales, each row including two bales longitudinally aligned, whereby the first of said rows engages the inwardly extending portions of the outermost bales as said rows are inserted therebetween, causing said outermost bales to pivot approximately ninety degrees thereby forming a first bale section on said first area of said forming table which includes two rows of bales, two bales per row, extending transversely between and normal to the sides of said pivoted outermost bales;
pivoting said first area of said forming table upwardly thereby inducing said first section to slide from said first area to a second area on said stacking table;
receiving a second array of three bales in longitudinal alignment onto said first area of said forming table;
fixing the outermost bales of said second array for pivotal movement about a point and removing the inner bale extending therebetween from said forming table; and
inserting successively a series of three bale rows transversely between the outermost bales, each row including two bales longitudinally aligned, whereby the first of said rows engages the inwardly extending portions of said outermost bales of said second array as said rows are inserted therebetween, causing said outermost bales to pivot approximately 90°, thereby forming a second bale section on said first area of said forming table which includes three rows of bales, two bales per row, extending transversely between and normal to the sides of said pivoted outermost bales, whereby said first and second sections of bales are disposed adjacent each other on second and first areas of said forming table respectively, thereby forming a tie tier of bales thereon.

20. A method of forming a tie tier on a forming table of a bale wagon as set forth in claim 19 wherein subsequently to the formation of the second section of bales an additional step of receiving a third array of three bales in longitudinal alignment onto said forming table is performed, said third array being disposed adjacent to said second section of bales.

* * * * *

UNITED STATES PATENT OFFICE
CERTIFICATE OF CORRECTION

Patent No. 3,664,519                    Dated May 23, 1972

Inventor(s)       Donald M. Grey

It is certified that error appears in the above-identified patent and that said Letters Patent are hereby corrected as shown below:

In the list of References Cited, cancel "Blackmum"

and insert -- Backman -- therefor.

Signed and sealed this 19th day of March 1974.

(SEAL)
Attest:

EDWARD M. FLETCHER, JR.            C. MARSHALL DANN
Attesting Officer                  Commissioner of Patents